United States Patent Office 3,445,176
Patented May 20, 1969

3,445,176
METHODS OF AND COMPOSITIONS FOR COLORING COLLOID COATED SURFACES
Paul H. Jamieson, 9341 Peninsula Drive,
Dallas, Tex. 75218
No Drawing. Filed June 6, 1966, Ser. No. 555,290
Int. Cl. D06p *3/00, 3/02, 5/00*
U.S. Cl. 8—3                            5 Claims

ABSTRACT OF THE DISCLOSURE

A method of coloring a photographic type colloid coated surface by applying to the surface a solution containing a major effective portion of a polyhydric alcohol, a minor effective portion of an alcohol-soluble alkyd resin, and a minor effective portion of a dye, and then adding sufficient water to said solution to drive the dye therefrom and into the colloid surface.

This invention relates to a method of and compositions for the coloring of a colloid coated surface. This invention is particularly adaptable to coloring of photographic surfaces which are provided with a colloid coating. The compostions for and methods of applying color may be used equally well on surfaces from which photosensitive materials have been removed or omitted in manufacture.

The specific type of surface required for application of color by the present method is one having a continuous coating of colloid over the film or base support so that such support is protected from direct fluid contact with the color compostions. The colloid coatings with which this invention may be used are capable of becoming hydrophilic without dissolving in the color compositions or in water at normal room temperatures. Known coatings which satisfy this requirement contain gelatin.

The color compositions of the present invention have the power to dissolve at least some water and to become water dispersible when added to water while as originally compounded they must not have enough water to materially increase the hydrophilic content of the colloid coating on which they are applied. This invention contemplates methods of adding water to such color compositions either before or after its aplication to the colloid surface to control the penetration and fixing of color both on and into the surface.

The present invention contemplates methods of application and formulations containing an alcohol soluble alkyd resin which will precipitate upon the colloid surface to hold any excess color on the surface when extra moisture is applied to fix color into the surface as described above.

One advantage of the present invention is the ability to limit the penetration of color into colloid coated surfaces even though the applied color is in near saturated concentration in its solvent. This is an advantage over the usual methods of controlling the penetration of color in water coloring of photographs by the composition of the color solvent. In the old water dissolved dye method of coloring it was necessary to decrease depth of applied color because of the rapid and uncontrollable absorption of water by the gelatin. This in turn led to excessive swelling of the gelatin surface and increased the danger of damage to the surface of the picture. The use of high concentrations of dye, the penetration of which is controlled by limiting the degree of moisture absorption of the colloid surface, leaves the surface mechanically firm and relatively resistant to scratching or puncture.

The method of hydration control revealed in this invention is especially useful in the even spreading of color over large areas because the spreading and blending is completed before the deep penetration of color into the surface of the colloid.

Heretofore, when color was to be added to a photographic surface, several methods were employed, including the application of oil paint to the surface of the photographs. Obtaining even distribution of an oil paint on the surface of a photograph is difficult. As explained above, when a dye suspended or dissolved in a conventional water solution is applied to a gelatin surfaced photograph, the gelatin will swell and become soft. Also, with water based dye solutions, once the dye is applied to the photographic surface it is practically impossible to remove since it becomes "fixed" in the gelatin.

The term "color" is meant to be inclusive also of monochrome or black, white and grey as well as other colors.

There has been a need for a photograph dye which would penetrate the colloid or gelatin surface of a photograph to assure even application, but which would not cause inordinate swelling of the gelatin. The need has also existed for a dye, the rate of penetration of which could be controlled. It is also desirable to have a dye which will not penetrate the gelatin surface of a photograph until the operator applying the dye is satisfied that only those areas which are to be dyed have been covered.

The present invention, as explained above, satisfies these needs.

The method of the present invention generally includes the step of applying a "dye" solution to the surface of the photograph. The "dye" solution includes a polyalcohol, an alcohol soluble alkyd resin and a dye. Next, a stream of moisture-laden gas is passed over the applied "dye" solution for driving the dye into the gelatin layer of the photograph.

If a faster penetration of the dye is desired, then an "accelerator" solution comprising distilled water and acetic acid may be added to the "dye" solution.

The solutions of the present invention are generally those described above and more specifically described hereafter.

With the more hydroscopic polyalcohols, it is desirable to add an alcohol ether to minimize swelling of the colloid upon addition of the water to the dye solution.

Typical of hydroscopic components which are suitable are polyhydric alcohols, including triols and diols. Preferred polyhydric alcohols are below in the order of their preference:

Hexylene glycol
1,5-pentanediol
Propylene glycol
Ethylene glycol
Hexanetriol
Glycerol
Sorbitol Typical of the alcohol ethers which may be used are the following listed in their order of preference:

Propylene glycol monomethyl ether
Diethylene glycol monoethyl ether

It is a general property of alcohol ethers to hold water in a strong molecular aggregate bond and also a property of the glycols to attract and absorb water.

Addition of water to a solution of a polyalcohol containing an alcohol soluble alkyd resin and a dissolved water or spirit soluble dye will cause relative immiscibility to exist, simultaneously precipitating the dye and resin from solution. Since the gelatin layer normally provided on photographs is relatively soluble in water, the dye and water will penetrate the surface of the photograph and dye the colloid layer.

Various dyes, spirit or water soluble, may be employed and typical examples are those listed below which may be used singularly or in combination.

| Color Index Name: | Color Index No. |
|---|---|
| Acid Orange 8 | 15575 |
| Acid Red 1 | 18050 |
| Acid Violet 12 | 18075 |
| Acid Violet 17 | 42650 |
| Acid Orange 51 | 26550 |
| Acid Green 9 | 42100 |
| Acid Red 73 | 27290 |
| Acid Yellow 23 | 19140 |
| Solvent Yellow [1] | none |
| Acid Black [2] | none |

[1] A basic chrome metallized azo dye sold under the trademark of Calcofast Spirit Yellow 2 R conc. by American Cyanamid Co.

[2] A basic chrome metallized azo dye sold under the trademark of Calcofast Spirit Black R.B. by American Cyanamid Co.

The above illustrated dyes are only representative and those skilled in the art will appreciate that various dyes may be used, it only being necessary that they form a solution with a polyalcohol and resin admixture.

Any alcohol soluble alkyd resin known in the art can be used in the practice of this invention. Alkyd resins are formed by the union of dibasic acids or anhydrides with polybasic alcohols, Condensed Chemical Dictionary, Sixth Edition, Reinhold (1956), page 40.

The alkyd resin is used to achieve denser colors. A resin, such as Aerochem 462A, (Archer Daniel Co.) formed by the union of phthalic anhydride and glycerol, is prepared. The resin, upon addition of water to the dye solution, precipitates on the colloid surface to which the solution is applied for fixing dye on the surface.

A constituent which is not essential, but which is preferably added to the "dye" solution is a surfactant, such as "Tergitol TMN" which is trimethyl nonyl ether of polyethylene glycol. The surfactant aids in preventing the "dye" solution from forming globules on the surface of the photograph and thereby aids in obtaining uniform coloring.

DYE SOLVENT I

A preferred dye solvent comprises a solution of the following constituents in the indicated proportions:

| | Ml. |
|---|---|
| Tripropylene glycol monomethyl ether | 800 |
| Alkyd resin solution (5.33 gm. "Aerochem 462A" Resin dissolved in 16,000 ml. ethyl hexane diol) | 80 |
| Hexylene glycol | 3,600 |
| Propylene glycol | 4,800 |
| Distilled water | 560 |
| "Tergitol TMN" | 40 |

Typical dye solutions are those illustrated below:

Example 1

(Yellowish-Gray Dye Solution)

| | | |
|---|---|---|
| Dye solvent (above) | ml | 40 |
| Acid Orange 8 | gm | .350 |
| Acid Black | gms | 1.4 |

Example 2

(Gray-Blue Dye Solution)

| | | |
|---|---|---|
| Dye solvent (above) | ml | 35 |
| Acid Black | gm | 1 |
| Acid Violet 17 | gm | .1 |

Example 3

(Violet-Gray Dye Solution)

| | | |
|---|---|---|
| Dye solvent (above) | ml | 320 |
| Acid Black | gms | 8 |
| Acid Red | gm | .4 |
| Acid Violet 17 | gm | .4 |

Example 4

(Scarlet Dye Solution)

| | | |
|---|---|---|
| Dye solvent (above) | ml | 900 |
| Acid Red 73 | gms | 9 |

Example 5

(Carmine Dye Solution)

| | | |
|---|---|---|
| Dye Solvent (above) | ml | 900 |
| Acid Violet 17 | gms | 5 |

Example 6

(Yellow Dye Solution)

| | | |
|---|---|---|
| Dye solvent (above) | ml | 1800 |
| Acid Yellow 23 | gms | 70 |

Example 7

(Black Dye Solution)

| | | |
|---|---|---|
| Dye solvent (above) | ml | 400 |
| Acid Black | gm | 10 |

The above examples are illustrative of the variation in color possible with the present invention. Various other dyes may be incorporated with the dye solvent described above and indeed various dye solvents, such as described, may be used. Another preferred dye solvent, which may be substituted for the above Dye Solvent I, comprises a solution formed from the following constituents.

DYE SOLVENT II

| | Ml. |
|---|---|
| Propylene glycol | 750 |
| Alkyd resin solution (5.33 gm. "Aerochem 462A" dissolved in 16,000 ml. ether hexane diol) | 25 |
| "Tergitol TMN" | 1 |
| Propylene glycol monomethyl ether | 125 |
| Hexylene glycol | 50 |

By varying the relative proportions of polyalcohols and alcohol ethers with a selected dye, the degree of dye penetration may be controlled. Generally, the more alcohol ether present, the more water will be necessary to release the dye from the solution. With the two dye solvents listed above the mere blowing of breath for a few seconds over the "dye" solution will "trigger" the release of the dye. Of course, steam may be applied to the surface of the photograph to achieve the same result. Another instrument which may be used to impart moisture is an artist's air brush.

Because the dye will not freely penetrate the gelatin layer on a photograph until the application of moisture, the individual applying the dye may apply the dye solution and remove it at his leisure from areas which are not to be dyed before application of moisture. Also, by selectively applying moisture, the degree of dye penetration may be regulated. Thus, dye may be applied to a surface, a small amount of moisture applied, and the solution wiped away with a tissue or the like to test the results. If a deeper color is needed, a second application of the "dye" solution may be made, additional moisture added, and the above steps repeated until the desired degree of color is achieved.

Since relatively large amounts of moisture are not applied, inordinate swelling and softening of the gelatin layer of the photograph is avoided and subsequent applications may be made without waiting for the gelatin to dry.

If the rate of the penetration of a particular "dye" solution is too slow, an accelerator solution of glacial acetic acid and distilled water may be added to the "dye" solution. A typical accelerator solution is as follows:

Accelerator solution

| | Ml. |
|---|---|
| Glacial acetic acid | 5 |
| Distilled water | 100 |

The accelerator solution may be applied to the surface of the photograph before application of the "dye" solution or may be mixed with the "dye" solution before application. The amount of accelerator solution used should preferably not exceed fifty percent of the combined volume, but more can be used, if desired.

While the above listed dye solutions are preferred for applications where deep penetration of color is desired, the following dye solutions are satisfactory:

DYE SOLVENT III

| | Ml. |
|---|---|
| Ethyl Hexane Diol | 16,000 |
| Alkyd Resin ("Aerochem 462A") | 100 |

Example 8

(Yellow Dye Solution)

| | | |
|---|---|---|
| Dye Solvent III | ml | 180 |
| Acid Yellow 23 | gms | 5 |

Example 9

(Black Dye Solution)

| | | |
|---|---|---|
| Dye Solvent III | ml | 400 |
| Acid Black | gms | 5 |

Numerous examples could be given of various dye solutions, it only being necessary that the particular dye used be soluble in the dye solvent, and that sufficient quantity of dye be used to obtain a coloring of the colloid.

In some applications it may be desirable to use a dye solution containing a dye which will set-up only on the surface of the colloid. In such instances a dye which will not penetrate into the gelatin may be selected, such as:

Example 10

(Blue-Black Dye Solution)

| | | |
|---|---|---|
| Dye Solvent III | ml | 100 |
| Calco Nigrosene SS B | gms | 10 |

In other application, it may be desirable to incorporate in one dye solution a penetrating and non-penetrating dye to obtain a contrast effect due to the absorption of one color into the colloid and the fixing of the other upon the surface.

With all of the illustrated dye solutions, the addition of moisture as described above, either before or after application of the solution to the colloid surface will initiate release of the dye. Preferably, moisture is progressively added after applying the solution to the surface to achieve controlled coloring of the colloid without inordinate swelling of the gelatin.

The present invention may be used in the reproduction of color works and the creation of original art forms. Other uses will occur to those skilled in the art, though the preferred usage is in the coloring of photographic images.

Having described the invention in connection with certain specific embodiments thereof, it is to be understood that further modifications may now suggest themselves to those skilled in the art and it is intended to cover such modifications as fall within the scope of the appended claims.

What is claimed is:

1. A method of coloring a surface coated with a photographic type colloid coated surface, comprising the steps of:
   (a) applying to said surface a solution that does not substantially swell the colloid and that upon the addition of sufficient water deposits a dye comprising a major effective portion of a polyhydric alcohol, a minor effective portion of an alcohol soluble alkyd resin, and a minor effective portion of a dye, and
   (b) adding sufficient water to said solution to drive said dye therefrom whereby said dye penetrates the colloid surface.

2. The method of claim 1 wherein the solution additionally contains an alcohol ether.

3. The method of claim 1 wherein water is added to said solution by passing a moisture-laden gas over said solution.

4. The method of claim 1 wherein water is added to the solution by spraying water onto the solution.

5. The method of claim 1 further comprising adding acetic acid along with said water in step (b) to drive said dye from said solution.

References Cited

UNITED STATES PATENTS

| 3,244,518 | 4/1966 | Schwerin et al. | 96—2 |
| 3,148,058 | 9/1964 | Land et al. | 96—2 |

NORMAN G. TORCHIN, *Primary Examiner.*

JOHN E. CALLAGHAN, *Assistant Examiner.*